Nov. 4, 1969  J. F. BURKE  3,476,524
APPARATUS AND METHOD FOR TREATING GASEOUS
PRODUCTS OF COMBUSTION
Filed Feb. 21, 1966  2 Sheets-Sheet 2
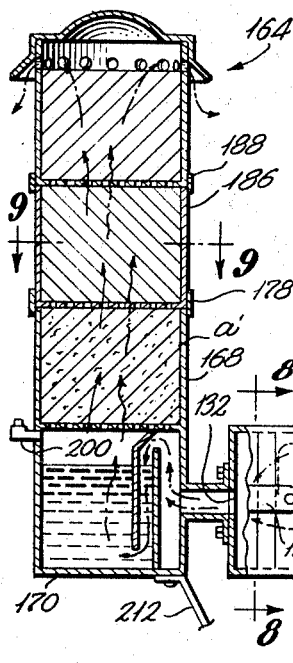
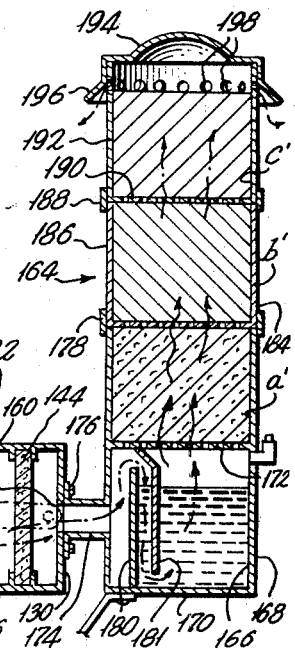
Fig. 5.
EXHAUST GASES
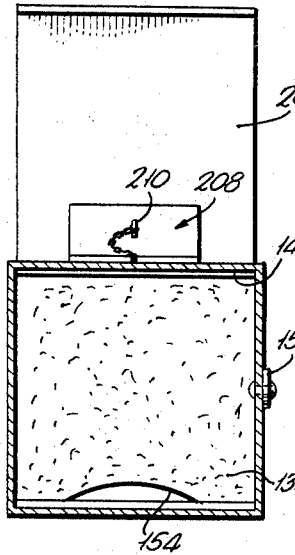
Fig. 6.
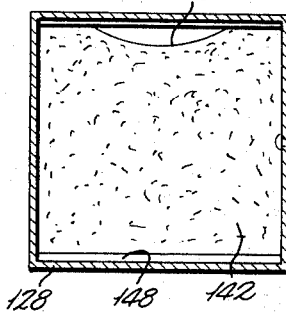
Fig. 7.
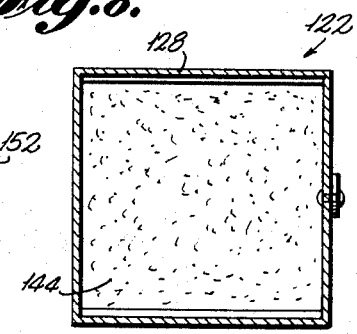
Fig. 8.
Fig. 9.
INVENTOR
James F. Burke
BY Shoemaker and Mattare
ATTORNEYS

# United States Patent Office 3,476,524
Patented Nov. 4, 1969

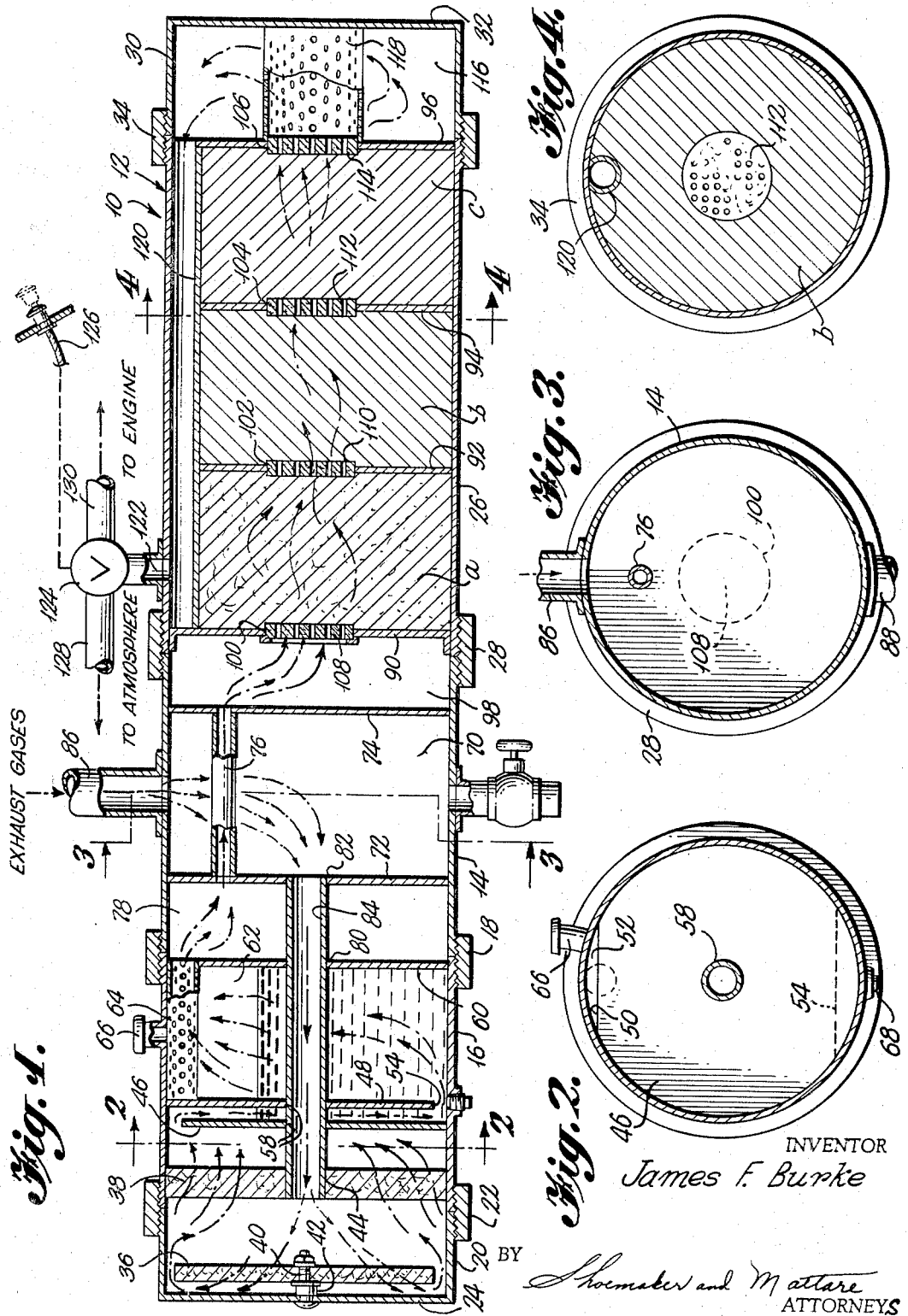

3,476,524
APPARATUS AND METHOD FOR TREATING
GASEOUS PRODUCTS OF COMBUSTION
James F. Burke, 148 E. 19th St.,
New York, N.Y. 10003
Filed Feb. 21, 1966, Ser. No. 529,069
Int. Cl. B01d 47/02; B01j 9/00
U.S. Cl. 23—288                                    8 Claims This invention provides new ways and means for gas treatment and is directed particularly to the treatment of gaseous products of combustion for the purpose or object of removing therefrom undesirable constituents thereof.

The question of air pollution is becoming a serious one particularly in industrial areas and in cities where many types of fuel combustion apparatus are in daily operation in connection with the heating of homes, industrial establishments and places of business by fuel oil, coal, natural or manufactured gas and the like and from the operation of numerous motor vehicles employing gasoline and oil for the operation of the engines thereof.

In the burning of fuel for the various purposes referred to, particularly coal and fuel oil and other fuel products derived therefrom, even where combustion of the fuel is complete or nearly so, volatile irritating substances such as sulphur and the like are discharged into the atmosphere as well as carbon monoxide and soot and other substances resulting from partial or incomplete combustion of the fuel material. All of these substances contaminate the air and create serious health problems.

An important object of the present invention is to provide a new and relatively simple apparatus and a new method, whereby gases produced in the manner claimed herein may be effectively treated to remove therefrom undesirable constituents whereby the final gas product is free of the harmful constituents.

A further object of the invention is to provide a novel apparatus for the purpose as stated, which is of relatively simple construction and designed to be strong and durable. A still further object of the invention is to provide apparatus of the character stated which is constructed in a novel manner to facilitate changing parts thereof when necessary for cleaning or replacement and for recharging the chemical containing chambers when necessary.

More specifically, the invention has for an object to provide, in one embodiment thereto, a gas cleansing and purification apparatus designed to be connected with the exhaust pipe of a motor vehicle engine or other internal combustion engine to eliminate from the exhaust gases carbon monoxide, soot and other undesirable material.

In addition to the foregoing, a further object of the invention is to provide an apparatus for connection with the exhaust pipe of an internal combustion engine, wherein means is provided for returning the purified gases to the intake manifold or to the carburetor of the engine or to discharge the gases into the atmosphere if return of the gases to the engine is not desired.

Still another object of the invention is to provide apparatus of the character stated for accomplishing the objects hereinbeore set forth, in another embodiment designed for connection with a chimney flue or other gas discharge conduit leading from the combustion chamber of a furnace or other heating equipment employing coal, wood or fuel oil.

A further object of the present invention is to set forth a novel method for treating the gaseous products of combustion to remove or convert noxious components to non-poisonous effluence.

A still further object of the present invention is to provide a method whereby the exhaust gases from smoke stacks and internal combustion engines are purified by filtering and washing said gases and subsequently treating said gases in sequential sorption oxidation and catalytic steps to remove or convert the noxious components.

Another object of the present invention is to provide a method, setting forth precise compounds in specified amounts for treating exhaust gases, to oxidize, react, absorb and adsorb the noxious components therein and convert the non-adsorbed components to non-toxic compounds.

Numerous other objects and advantages of the invention will become apparent as the description of the same proceeds and the invention will be best understood from a consideration of the following detailed description taken in connection with the accompanying drawings forming a part of the specification:

FIG. 1 is a view in vertical longitudinal section of one embodiment of the invention designed for attachment to an exhaust pipe of an internal combustion engine;

FIG. 2 is a transverse section taken in a vertical plane substantially on the line 2—2 of FIG. 1;

FIG. 3 is a transverse section taken in a vertical plane substantially on the line 3—3 of FIG. 1;

FIG. 4 is a transverse vertical section taken substantially on the line 4—4 of FIG. 1;

FIG. 5 is a vertical longitudinal section through another embodiment of the invention designed primarily for but not necessarily restricted to, attachment to a furnace smoke stack or other type of conduit leading from a furnace combustion chamber or the like, parts of the structure being shown in elevation;

FIG. 6 is a transverse section taken in a vertical plane substantially on the line 6—6 of FIG. 5;

FIG. 7 is a vertical section in a vertical plane taken substantially on the line 7—7 of FIG. 5;

FIG. 8 is a transverse section taken in a vertical plane substantially on the line 8—8 of FIG. 5; and FIG. 9 is a section in a horizontal plane taken substantially on the line 9—9 of FIG. 5.

The method of the instant invention may be performed in various apparatus other than those disclosed herein, which are adaptable for treating exhaust gases from internal combustion engines and exhaust gases from chimneys.

In the instant invention exhaust gases from chimneys are led into a confining means wherein the gases are diverted into two directions. The gases are further forced through a series of filters wherein the soot and other heavy deposits are removed. The gases are subsequently restricted through narrow passages up through a liquid absorbent medium. The gases then flow through a confining means containing sequentially arranged compartments, a first compartment in said confining means containing a solid material which both absorbs and adsorbs carbon monoxide and any oil contained in the gases, a second compartment containing a solid oxidant which oxidizes carbon monoxide to carbon dioxide and any unburned hydrocarbons, a third compartment containing a solid catalyst which breaks up heavy metal compounds and converts any remaining unburned hydrocarbons and subsequently passes the gases to the atmosphere.

The gases led into the first confining means which were diverted in the other direction were treated in substantially the same manner.

In the instant invention gases coming from an internal combustion engine are restricted and subsequently enlarged in a confining means wherein the heavier particles of material are deposited. They are then restricted and passed into another confining means wherein they are enlarged and passed through filters which filter out any carbon and oils in the gas. The gases are then restricted in a passage which forces them up through a liquid absorbent which causes the dissolution and absorption of lead and sulphur. The gases are then again restricted and forced into a confining means wherein are contained sequentially arranged solid treating materials, the first of which is a solid material containing both adsorbents and absorbents, the second of which is a solid oxidant material and the third a solid catalytic material. The gases again are forced out of the catalytic material through a restricting means wherein they are led back to the engine or in the alternate to the atmosphere.

A more detailed description of the chemical treatment of the exhaust gases as they pass through each phase is set forth below.

The exhaust gases from either internal combustion engines or from chimneys are first filtered through a fiberglass filter or any other suitable material which will remove soot and other heavy deposits in the gas. Subsequently, the exhaust gases are led through a washing chamber wherein is contained a washing liquid containing predominantly decahydronaphthalene with smaller percentages of alcohol, ether, and dissolved camphor. A preferred composition comprises about 75 percent decahydronaphthalene, 11 percent alcohol, 11 percent ether and 3 percent dissolved camphor.

In this washing step the dissolution of lead and sulphur takes place wherein the sulphur containing compounds are absorbed.

After the exhaust gases bubble through the wash liquid they are passed through a solid adsorbent and absorbent composition. The solid composition containing predominantly activated alumina and cuprous chloride both adsorbs and absorbs from the gases carbon monoxide and any oils that still may be contained in the gases. The activated alumina adsorbs any oil contained in the gases while the cuprous chloride absorbs carbon monoxide. There is contained herein ammonium salts which have absorbent capabilities with regard to carbon monoxide. A preferred composition of the adsorbent is activated alumina 45 percent, cuprous chloride 25 percent, potassium acetate 10 percent, magnesium salts 7 percent, ammonium salts 7 percent, and alkaline earths 6 percent.

The gases are then directly passed through a solid oxidation composition which oxidizes any carbon monoxide left in the gas to carbon dioxide and also oxidizes unburned hydrocarbons, such as methane.

In the oxidation step, heavier metals are removed. A preferred composition of solid oxidants suitable for this purpose is activated alumina 45 percent, sodium permanganate 10 percent, nickel oxide 10 percent, cobalt 10 percent, copper chloride 10 percent, palladium 15 percent.

Finally, the gases are passed through a catalyst which breaks up and dissolves heavy metal compounds and converts any remaining unburned hydrocarbons. A suitable catalyst composition for performing the above is the following: activated alumina 50 percent; activated magnesium oxide 30 percent; boron 5 percent; cobalt 5 percent, and palladium 10 percent.

Referring now more particularly to the accompanying drawings, attention is first directed to one embodiment of the invention illustrated in FIGS. 1–4 inclusive whereby the hereinafter described process may be carried out.

In the figures of the drawings, particularly referred to, the numeral 10 generally designates the said one embodiment of the apparatus by which the process may be performed.

As shown, the structure 10 is preferably in the form of an elongate shell generally designated 12 and comprised of a number of joined-together or connected sections as about to be described.

While the several sections of the shell will be specifically identified, it will be apparent that the shell may be constructed in a greater or a lesser number of the sections, designed to form the several hereinafter described individual chambers employed in connection with the various steps or stages of treating the gases.

In the shell construction shown, the numeral 14 designates a central section.

The numeral 16 designates the wash chamber section joined to and in end abutting relation with an end of the central section in a suitable manner as, for example, by means of the screw threaded connecting ring or band 18.

At the outer end of the section 16, the section is closed by the end cap 20 which is joined to the outer end of the section 16 by the screw threaded ring or band 22, the exterior surfaces of the sections being suitably screw threaded to facilitate the joining of the sections together.

The end cap 20 is of the same cross sectional configuration as the other sections 14 and 16, and is closed by the head wall 24.

Abutting and extending outwardly from the other end of the center section 14 is a relatively long shell section 26 which may be designated the dry treatment chamber section. This section 26 at its inner end is joined to the adjacent end of the center section 14 by the threaded coupling band or ring 28.

The outer end of the section 26 is covered and closed by the end cap 30 which is of the same cross sectional configuration as the section 26 and which carries the end wall or head 32.

The inner end of the cap 30 abuts the outer end of section 26 as shown, and is removably secured thereto in a suitable manner as, for example, by means of the encircling coupling band or ring 34.

At the outer end of the section 16 are two spaced filter units 36 and 38 which are illustrated as being in the form of relatively flat discs or plates, the filter unit 36 being relatively thin and of an over-all diameter or width less than the inside diameter of the end cap 20 in which it is located. This unit 36 is supported in a suitable manner within and concentrically of the end cap as, for example, by means of a supporting stud or pin 40 secured at one end to the head wall 24 and and attached to the filter unit, the bolt or pin here being shown as extending through the filter unit and being provided with a spacer means 42 for maintaining the filter unit in spaced relation with the head wall 24 shown. Obviously, however, other means might be employed for holding this filter unit in the desired position whereby it will be functional in the manner hereinafter described.

The filter unit 38 is somewhat heavier or thicker than the unit 36 and is of an outside diameter to be snugly inserted in the end of the section 16 in the manner illustrated.

The unit 38 has a central aperture therein as indicated at 44, for the purpose about to be described.

Disposed inwardly of and spaced from the filter unit are two spaced baffle plates 46 and 48. These plates are in spaced overlapping relation as shown and a portion of the top edge of the outermost plate 46 is cut away as indicated at 50 (see FIG. 2), to provide a narrow gas passageway 52. The lower or opposite edge of the inner baffle plate 48 is likewise cut away as indicated at 54 in FIGS. 1 and 2 to provide the bottom opening or fluid flow space as indicated at 56 in FIG. 2.

The baffle plates 46 and 48 are provided with aligned openings 58 which align with the opening 44 in the filter 38.

Within the shell section 16 there is mounted the wall plate 60 which is in spaced relation with the inner baffle plate 48 as shown. This wall plate 60 functions in cooperation with the baffle plate 46 to provide a wash liquid chamber 62.

Extending between the top of the inner baffle plate 48 and the top of the wall plate 60 is a perforated tube 64 which extends through the wall plate 60 and opens into the area on the opposite side of the wall plate from the interior of the chamber 62 as shown while the other or outer end of this tube is closed by the baffle plate 48.

The numeral 66 designates a filling nozzle by means of which liquid may be introduced into the chamber 62 and the numeral 68 designates a plugged drain opening for the chamber 62.

The numeral 70 designates the gas receiving chamber which is located in the central portion of the center section 14 and is defined by the spaced walls 72 and 74 which are fitted in the center section 14. These spaced walls are connected by a cross-over tube 76 which passes through the gas chamber 70 and opens at its ends through the two wall plates 72 and 74 which it connects together.

The wall plates 60 and 72 are in spaced relation as shown thus forming the intermediate chamber 78 into which the perforated tube opens and into which opens also an end of the cross-over tube 76.

The plates 60 and 72 are provided with openings 80 and 82 respectively which are in alignment with one another and with the openings 44 and 58.

The numeral 84 designates a gas pipe which is secured at its ends in the openings 44 and 82 of the filter 38 and gas chamber wall 72 respectively and which passes through and is in fluid tight connection with the edges of the openings 58 and 80.

The chamber 70 is designed to receive gaseous products of combustion from a source such, for example, as an internal combustion engine exhaust pipe or the like and for this purpose there is provided the coupling nipple 86 which is secured to the center section 14 as illustrated and opens into the chamber 70.

There is also provided a trap 88 for receiving soot entering the gas chamber, the inlet of which trap opens, of course, into the chamber 70 in the manner illustrated. Through this trap any collected soot may be removed when necessary by a suitable means such as a vacuum apparatus or the like (not shown) attached thereto.

The interior of the section 26, hereinbefore referred to as the dry treatment chamber section, is divided into three compartments or chambers which are designated a, b and c, by the four partitions or division wall plates 90, 92, 94 and 96.

The first partition plate 90 is spaced from and forms with the wall 74 the intermediate chamber 98 which has the tube 76 in communication therewith.

The partition plates 90, 92, 94 and 96 are provided with central openings 100, 102, 104 and 106 and in each of these openings there is fitted a fine mesh filter screen, the screens being respectively designated 108, 110, 112 and 114.

As illustrated in FIG. 1 the fourth or outermost partition plate 96, which is the plate farthest removed from the gas chamber 70, lies adjacent to the outer end of the section 26 and is covered by the end cap 30 whereby there is provided the terminal chamber 116. Interposed between the partition plate 96 and the head wall 32 and spanning the chamber 116, is the perforated tube 118 which is aligned with the opening 106 and with the filter screen 114 as illustrated.

The numeral 120 designates a lead-off tube for the purified or decontaminated gases. This tube spans the three treatment chambers as shown and communicates at its outer end with the terminal chamber 116 as illustrated. Adjacent to its inner end the gas lead-off tube 120 is in communication with a discharge nipple 122 which is connected with a two-way control valve 124. This valve may be actuated by any suitable remote control means such as a conventional Bowden wire 126 so as to selectively direct the purified or decontaminated gases either to the atmosphere by way of the pipe 128 or to a suitable source for using the gas, as by way of the pipe 130. In the use of the apparatus described for decontaminating exhaust gases, the cleansed or decontaminated gas may be conveyed by the pipe 130 to an engine carburetor or intake manifold if desired.

As hereinbefore stated, the chamber 62 is designed to contain a wash liquid through which the gases pass after passing through the filters 36 and 38.

The treatment chambers a, b and c are filled or packed with dry chemicals through which the washed gases pass, the chamber a being adapted to contain sorption material while the chamber b is provided to contain an oxidant or oxidant chemicals while the chamber c is provided to contain catalytic materials. The wash liquid and the other treatment materials are referred to above with reference to the compositions present in the different chambers and the action of the compositions upon the gases passing therethrough.

Referring now to a second embodiment of the invention as illustrated in FIGS. 5 to 9 inclusive, this embodiment of the apparatus, generally designated 122, is designed particularly for treating exhaust gases from stoves, furnaces and the like where such structures are conventionally connected with vertical smoke stacks through which the smoke and fumes or gases from the combustion chambers of the furnaces or stoves, rise by normal draft or under the influence of forced draft for discharge into the atmosphere.

The structure 122 is designed to be mounted upon the top of a chimney or smoke stack, a portion of such structure here being shown in broken lines and generally designated 124. While the specific construction and arrangement of parts of this embodiment of the invention will be seen to differ from the structure illustrated in FIG. 1, it will also be at once apparent that there is a close analogy between the two structures with respect to the working of the process to which the exhaust gases are subjected for decontamination or purification.

The structure 122 embodies the elongate shell or casing 126. In this embodiment of the invention the casing or shell 126 is preferably of rectangular cross-sectional configuration as illustrated in FIGS. 6, 7 and 8.

The numeral 128 designates the top wall of the casing structure while each end of the casing is closed by a wall 130 which has the central opening 132 therein.

Midway of its ends the casing has fitted therein the two spaced filter units 134 which form between them the centrally located chamber 136 for receiving the products of combustion rising through the stack 124 and passing into the chamber through the wall opening 138.

The bottom side of the wall 128, carries a collar 140 surrounding or defining the opening 138 and adapted to engage over the top of the chimney stack 124 to support the structure in position thereon.

Also fitted in and partitioning the shell 126 outwardly of each of the units 134, are filter units 142 and 144. Thus at each side of the gas or smoke receiving chamber 136 there are three filter units which are spaced apart longitudinally of the shell. These units are removably positioned in the shell and are adapted to be held in place by upper and lower pairs of guide strips 146 and 148 respectively which align the filter units with side wall openings 150 through which the filter units are introduced or removed as desired and means is provided in the form of suitable latches 152 which cover the slots or openings 150, for retaining the filter units in position.

The innermost filter units 134 have the bottom edges thereof notched or recessed as indicated at 154 to permit gases to pass from the chamber 136 into the next chamber 156.

The next filter unit to each of the units 134, which is the unit 142, has the top edge thereof likewise notched or recessed as indicated at 158 whereby gases from the chamber 156 may pass over into the next chamber 160. From this latter chamber the gases pass through the outermost filter unit 144 to the adjacent wall opening 132.

While it has been stated that the gases pass through the notches or recesses 154 and 158, they also pass through the filter units so that there is a partial filtering of the gases as they pass from the chamber 136 into the chamber 156 and into the chamber 160.

In its passage from the gas chamber 136 into the chamber 156 through the notch or recess 154 as well as through the filter unit 134 some soot and other entrained particles will be deposited in the chamber 156 and to facilitate cleaning this chamber there is provided in the bottom wall a cleanout plug 162 where a suitable vacuum machine may be connected to draw out the deposited material from the chamber and at the same time draw off any material which may be adhering to the second filter 142 on the side of the chamber 156.

At each end of the shell 126 there is located a vertical series of chambers, each series as a whole being designated 164, and which chambers correspond in their functioning to the wash chamber 62 and the chemical treatment chambers a, b, and c, such chambers in this structure or in each series 164, being particularly designated respectively a', b', and c', but in the claims the same reference characters are employed for both of the structures shown. The first chamber in each of the vertical series 164, corresponding to the wash chamber 62, is designated 166. This chamber is illustrated as having the cylindrical side wall 168 and the bottom wall 170 and the chamber has a perforated or apertured top wall 172 which is approximately midway of the height of the side wall 168 as shown.

The side wall 168, below the perforated partition wall 172, carries a laterally extending gas transfer nipple 174 which at one end opens into the wash chamber 166 and at its other end is suitably formed, as by an encircling flange 176, for attachment to an end wall 130 in alignment with the opening 132 therein whereby gases may pass over or be transferred from the outer end of the shell into the wash chamber.

The upper portion of the cylindrical wall 168 above the perforated screen forms the first chemical treatment chamber or sorption chamber a' and the top edge of the wall 168 is suitably formed as by means of an encircling flange 178 for the purpose hereinafter stated.

Within the wash chamber 168 there are positioned across the inlet end of the gas transfer nipple, the vertical, horizontally spaced baffle walls 180 and 181. As illustrated, the first baffle wall nearest to the inlet end of the nipple 176, is mounted upon the bottom wall 170 of the wash chamber and terminates short of the top thereof while the second baffle wall 181 is attached to the perforated partition wall 172 and extends downwardly in spaced relation with the wall 180, terminating short of the bottom wall 170. Thus there is provided the torturous passageway for the inflowing gases, the gases entering wash fluid in the chamber 166 after passing over the top edge of the wall 180 and flowing out into the main portion of the wash chamber after passing below the edge of the second baffle wall 181. After passing through the wash fluid in the chamber 166 the gas rises to pass through the screen or perforated partition wall 172 into the sorption material in chamber a'.

The next chemical treatment chamber, proceeding vertically from the wash chamber and from the sorption material chamber a' is the oxidant material containing chamber designated b'. This chamber may be of any suitable design or construction, it being here shown as in the form of the cylindrical wall unit, the bottom portion being in the form of the perforated plate or sieve 184 and this perforated bottom plate portion of the unit, the vertical circular wall of which is designated 186, is positioned within the flange 178 to be supported upon the top end of the wall 168. The top edge of the wall 186 has the encircling flange 188 in which is received the perforated bottom 190 of the cylindrical wall 192 which forms the catalyst chamber c'.

The top of the catalyst chamber is closed by the cap 194, which cap has a relatively deep flange which is outwardly flared as indicated at 196 to form a deflector for gases escaping from the top chamber or catalyst chamber through the apertures 198 in the wall thereof.

While the sections of the chambers b' and c' have been illustrated as joined together and to the lowermost cylindrical wall 168 by means of flanges which hold the sections together, obviously any other suitable means may be employed for connecting together the several sections of the chambers.

Suitable means is provided for introducing wash fluid into the wash chamber 166, such as the filling pipe or nozzle 200.

Any suitable means may be provided for connecting the flanges 176 of the gas transfer nipples to the walls 130 whereby the separation of the units 164 from the shell structures 126 may be conveniently effected for replenishing the chemical treatment chambers or for other purposes.

It will also be seen that one unit 164 may be readily removed for refilling the sections thereof while the opposite unit is maintained in operation and to permit this without interrupting the operation of the apparatus and also to permit removal of the filters 134, 142 and 144 there are provided the sliding gates 204. These gates are introduced through the top wall of the shell by way of suitable slots 206, spaced guide means 208 being shown which are positioned on opposite sides of the slots and between which guide means the gates are slidably positioned.

The slots 206 are disposed relative to the filters 134 whereby the gates when moved downwardly will be disposed in close proximity to the inner sides of the filters 134 so as to close off passage of fumes through the filters and through the recesses 154 thereof.

When the gates are raised to the positions shown in FIG. 5 any suitable means may be employed for holding them in the inoperative position, such as the removable pins 210 which may be passed through aligned openings in the guide flanges 208 and in corresponding openings in the gates, as will be readily apparent.

In order to stabilize the entire structure shown in FIG. 5, suitable braces 212 may be provided which, as shown, could be detachably secured to the bottom walls 170 of the wash chamber sections, with their lower ends secured in any suitable manner either to the lower portion of the chimney stack 124 or to an adjacent roof part or surface as will be readily obvious.

It is apparent from the foregoing that there is provided a new and novel method and apparatus for the treatment of gaseous products of combustion for the purposes of removing therefrom undesirable constituents such as carbon monoxide, sulphur, lead, unburned hydrocarbons, etc. This new and novel method provides multiple treatments of the exhaust gases by means of filtration, absorption, adsorption, oxidation and catalytic reaction, which is performed in an apparatus which is adapted in its various modifications for attachment to internal combustion engines or other exhaust outlets from industrial furnaces, dwelling heating furnaces, etc.

As stated above and apparent from the process, other apparatus may be used besides those described above.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. Apparatus for treating gaseous products of combustion for removal of undesirable constituents thereof, said apparatus embodying a sequential arrangement of units comprising, a means forming a chamber adapted to have the gaseous products of combustion introduced thereinto directly from the combustion source, means forming a wash liquid containing chamber, means for passing said gaseous products into and through wash liquid in said liquid containing chamber, filter means interposed between said first chamber and said wash liquid containing chamber for filtering said gases in the passage thereof into the wash liquid chamber, means providing a passage for flow of the filtered and washed gases out of said liquid containing chamber, means forming a group of at least three treatment chambers, constituting (a) a sorption material containing chamber (b) an oxidant containing chamber, and (c) a catalyst containing chamber, means for directing the filtered and washed gases into said sorption material containing chamber for chemical treatment therein, means for conducting the chemically treated gases from the sorption material containing chamber into the oxidant containing chamber for further treatment therein, means for passing the further treated gases from the oxidant containing chamber into the catalyst containing chamber for chemical treatment therein, the filtered and washed gases passing into and through said treatment chambers in the order recited, and means for discharging the treated gases from the catalyst chamber.

2. The invention as defined by claim 1, wherein the said means for directing the filtered and washed gases into the sorption material containing chamber includes a filtering screen through which the said gases pass into the latter chamber.

3. The invention as defined by claim 2, with other filter screens, one of said other filter screens being between the sorption material containing chamber and the oxidant containing chamber and another of said filter screens being between the oxidant chamber and the catalyst containing chamber.

4. The invention as defined by claim 1, wherein the means forming said first gas receiving chamber includes an elongate shell body having a top and having spaced walls therein, the shell body having a top gas inlet opening into said first gas receiving chamber, spaced first, second, third and fourth partition plates in the shell forming said treatment chambers *a, b* and *c* at one side of said first gas receiving chamber, filter screen means in each of said partition plates, a wall plate in the shell body in spaced relation with one of the spaced gas receiving chamber walls on the side of the latter remote from said partition plates and forming with the said one of first gas receiving chamber walls an intermediate chamber, said wall plate also forming one side of said wash liquid containing chamber, a pair of spaced baffle plates together forming an opposite side of said wash liquid containing chamber, said wall plate having a top opening leading into said intermediate chamber, means spaced from said baffle plates and closing the adjacent end of the shell body and forming with the baffle plates a filter element chamber, a filter element in and partitioning the filter element chamber, one baffle plate being adjacent to said filter element and having an opening at the top thereof leading into the space between the baffle plates, the other baffle plates having an opening in the bottom portion thereof communicating with the wash liquid chamber, means for conductiing gases from said first gas receiving chamber into said filter element chamber on the side of the filter element remote from said baffle walls, means for conducting gases from said intermediate chamber into another intermediate chamber between the other one of the spaced gas chamber receiving walls and said first partitioning plate, said means for discharging treated gases from the catalyst chamber *c*, being the filter screen means in said fourth partition wall.

5. The invention as defined by claim 4, with means closing the other end of said shell body and forming a terminal chamber with said fourth partition wall in which terminal chamber the discharged treated gases are received, and gas lead-off means for said terminal chamber.

6. The invention as defined by claim 5, wherein the said elongate shell body is formed in separable sections, facilitating the recharging of said treatment chambers, and the said means closing the ends of the elongate body comprising removable caps.

7. The invention according to claim 4, with means carried by said shell body forming a gaseous products of combustion conduit designed for connection with an exhaust conduit of an internal combustion engine such as a motor vehicle engine, and communicating with the said gas inlet opening into the first gas receiving chamber.

8. The invention as defined by claim 1, wherein the means forming said first gas receiving chamber includes an elongate horizontal shell body of polygonal cross sectional contour having top, bottom and side walls and end walls and the means forming a wash liquid containing chamber together with the means forming said group of at least three treatment chambers being embodied in a vertical structure adjacent to one of said end walls of said shell body, a pair of spaced units partitioning the shell body and forming said first gas receiving chamber, said bottom wall having an inlet for products of combustion flowing from a source such as a stove, furnace and the like, means for securing the shell body horizontally upon a chimney top in a position to have gases issuing therefrom into said first chamber through said inlet, one of said spaced units comprising a first filter unit, second and third filter units spaced apart in and partitioning the shell at the side of said first filter unit remote from said first gas chamber, the first and second units being in spaced relation, the spaced first, second and third units forming second and third gas chambers, the first and second filter units respectively having a bottom gas passing opening and a top gas passing opening therethrough, said third filter unit being adjacent to said one end wall, means forming a gas outlet through said one end wall, said wash liquid containing chamber being at the bottom of said vertical structure, the said means for passing gaseous products into and through wash liquid in said liquid containing chamber being connected to said gas outlet of said one end wall, said treatment chambers *a, b* and *c* rising in the order named above the wash liquid containing chamber, the said means providing a passage for filtered and washed gases out of the liquid containing chamber and directing the same into chamber *a* (the sorption material containing chamber) comprising a perforated partition wall separating the liquid containing chamber and chamber *a* perforated partition walls separating chambers *b* (the oxidant containing chamber) and chamber *c* (the catalyst containing chamber) and gas outlet means for chamber *c*.

References Cited

UNITED STATES PATENTS

| | | | |
|---|---|---|---|
| 1,432,351 | 10/1922 | McGahan | 23—288 XR |
| 2,789,032 | 4/1957 | Bagley et al. | 23—288 XR |
| 2,942,932 | 6/1960 | Elliott | 23—288 XR |
| 3,220,794 | 11/1965 | Stiles | 23—288 XR |

MORRIS O. WOLK, Primary Examiner

M. D. BURNS, Assistant Examiner

U.S. Cl. X.R.

23—2